United States Patent
Fatehi et al.

(10) Patent No.: US 6,694,100 B1
(45) Date of Patent: Feb. 17, 2004

(54) SPACE WAVELENGTH TIME-DIVISION MULTIPLE ACCESS OPTICAL TRANSMISSION SYSTEM

(75) Inventors: Mohammad Taghi Fatehi, Middletown Township, Monmouth County, NJ (US); Victor Bernard Lawrence, Holmdel, NJ (US); Kazem Anaraky Sohraby, Lincroft Township, Monmouth County, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 525 days.

(21) Appl. No.: 09/587,576

(22) Filed: Jun. 5, 2000

(51) Int. Cl.[7] .............................. H04J 14/08; H04J 4/00; H04J 14/02
(52) U.S. Cl. .............................. 398/99; 398/75; 398/82
(58) Field of Search .................................. 359/110, 116, 359/118, 119, 123, 127, 128, 136, 137, 139, 177; 370/442; 398/9, 58, 75, 82, 99, 100, 177

(56) References Cited

U.S. PATENT DOCUMENTS

| 5,005,166 A | * | 4/1991 | Suzuki et al. | 359/123 |
|---|---|---|---|---|
| 5,276,713 A | * | 1/1994 | Kato et al. | 375/364 |
| 5,500,857 A | * | 3/1996 | Nakata | 370/400 |
| 5,864,414 A | * | 1/1999 | Barnsley et al. | 359/125 |
| 6,023,359 A | * | 2/2000 | Asahi | 359/119 |
| 6,205,117 B1 | * | 3/2001 | Doshi et al. | 370/228 |
| 6,532,088 B1 | * | 3/2003 | Dantu et al. | 359/119 |
| 6,545,781 B1 | * | 4/2003 | Chang et al. | 359/124 |

* cited by examiner

*Primary Examiner*—Leslie Pascal
*Assistant Examiner*—Dalzid Singh (57) ABSTRACT

Station apparatus used at a Local Serving Office (LSO) and at one or more stations reduces contention for communication access over time slots and/or wavelengths and/or fibers of an optical facility. The station apparatus enables Space-Wavelength-Time Division Multiple Access (SWT-DMA) communications using a combination of two or more different communication modes selected from a group including (1) a space division multiplexed access (SDMA) mode which selects a fiber(s) of the optical facility, (2) a wavelength division multiplexed access (WDMA) mode which selects a wavelength(s) on a fibers, and (3) a time division multiplexed access (TDMA) mode which selects time slot(s) of a wavelength. Communication mode selection may utilize (1) out-of-band signaling, (2) optical tag signaling, or (3) time marker signaling over a wavelength of one or more of the optical fibers.

15 Claims, 7 Drawing Sheets

FIG. 4
STATION OPERATION FLOWCHART

FIG. 5
RESERVATION MESSAGE

FIG. 6
INTENTION_TO_SEND MESSAGE

SPACE WAVELENGTH TIME-DIVISION MULTIPLE ACCESS OPTICAL TRANSMISSION SYSTEM

TECHNICAL FIELD OF THE INVENTION

This invention relates to Wavelength Division Multiplexed (WDM) systems and, more particularly, to a method of and apparatus for providing a space, wavelength, and time division multiple access optical transmission system.

BACKGROUND OF THE INVENTION

The recently filed patent application of M. T. Fatehi, X. LaRoche, and K. Sohraby, "Wavelength Division Multiplexed System for Optical Access Rings," Ser. No. 09/274,199, filed on Mar. 22, 1999, describes a hubbed ring communications system where all laser sources are located in the central office. In that application, the a premises equipment (hereafter called a station) modulates the unmodulated optical signal CW received from the central office with the information that is being transmitted by the station. When an end user station transmits to another station, it modulates its data on the wavelength. The modulated wavelength is received, then demodulated and the original signal is extracted at the receiving station. Since there is no need for laser sources at the user stations, this method offers great cost advantages over other methods. Since the laser equipment is expensive and need special environmental conditioning, the prior method allows providing high bandwidth to the end users at a very low cost. The application of the prior method however is limited to a single station per wavelength; that is, a particular wavelength is assigned to a station until the network is reconfigured. Therefore, when multiple stations wish to access the same wavelength(s) sourced from the central office, there is the risk of contention among them.

What is needed is a technique to extend the prior method to a multiple station access case to enable many stations to access the same wavelength(s) at any time.

SUMMARY OF THE INVENTION

In accordance with the present invention, we enable multiple stations to access the same wavelength(s) sourced from a Local Serving Office (LSO) with contention resolution among the stations. More particularly, we disclose station apparatus for use at a Local Serving Office (LSO) and at one or more stations which are connected over an optical facility. The optical facility includes one or more optical fibers, at least one optical fiber carrying a plurality of optical communication wavelengths, and at least one of said wavelengths divided into multiple time slots. The station apparatus enables Space-Wavelength-Time-Division Multiple Access (SWT-DMA) communications using combination of two or more different communication modes selected from a group including (1) space division multiplexed access (SDMA) mode which selects a fiber of the optical facility, (2) wavelength division multiplexed access (WDMA) mode which selects a wavelength(s) on a fiber, and (3) time division multiplexed access (TDMA) mode which selects time slot(s) of a wavelength.

According to other features, communication mode selection may utilize (1) out-of-band signaling, (2) optical tag signaling, or (3) marker signaling over a wavelength of one or more of the optical fibers.

BRIEF DESCRIPTION OF THE DRAWINGS

In the drawings.

In the following description, identical element designations in different figures represent identical elements. Additionally in the element designations, the first digit refers to the figure in which that element is first located (e.g., 109 is located in FIG. 1).

DETAILED DESCRIPTION

Figure 1:
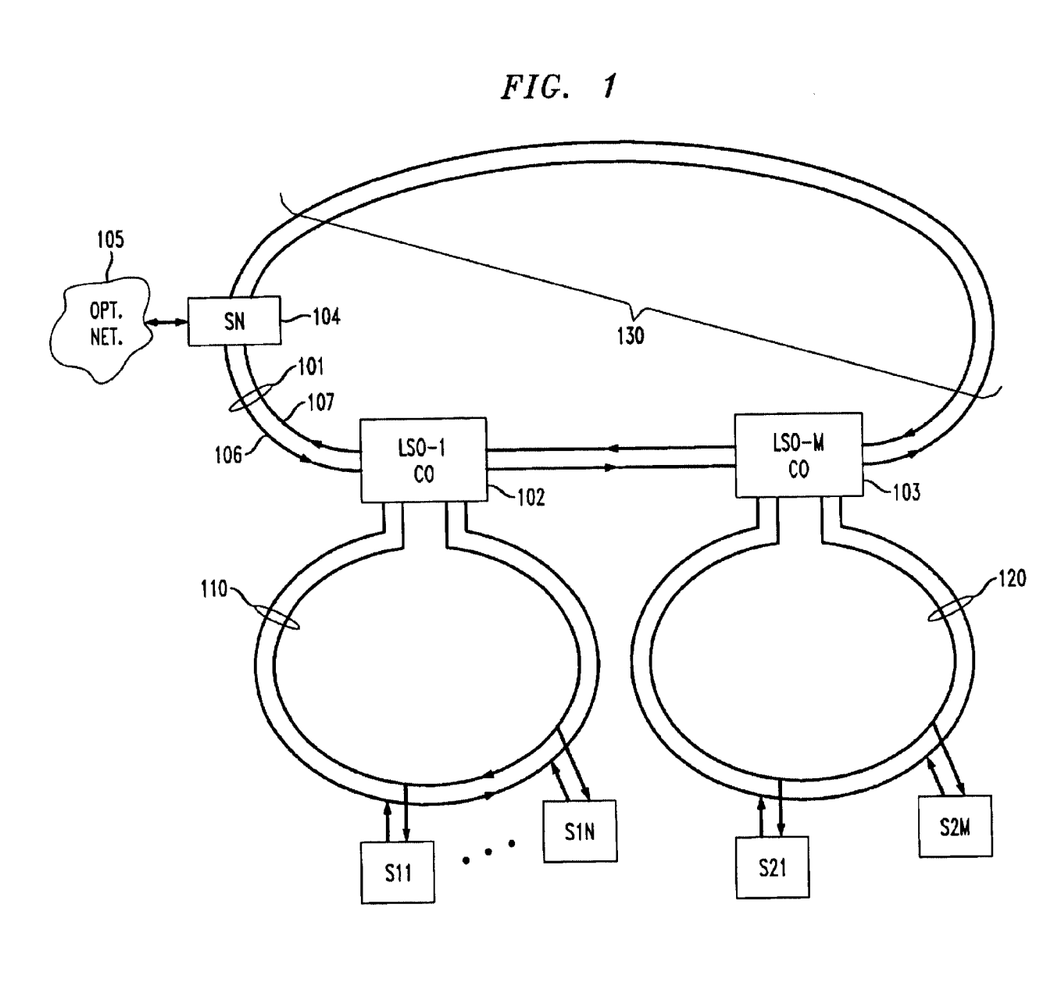
FIG. 1 shows an illustrative architectural diagram of an optical communication system useful in describing the operation of the present invention.

With reference to FIG. 1, there is shown an illustrative architectural diagram of an optical communication system in which the present invention may be utilized. As shown, the optical system may illustratively comprise, a metropolitan area optical network (MAN) including a high capacity backbone ring 101 (also referred to a Metro Inter Office (IOF) ring) which interconnects Local Serving Offices (LSO) 102–103 to a Service Node (SN) 104. The LSOs 102–103 are typically Central Offices (COs) of a telephone company and are hereinafter referred to as such. The IOF ring 101 may include one or more optical fibers 106 and 107 to handle the traffic in each direction an alternative optical system arrangement the optical facilities 101, 110, and 120 may be a unidirectional bus structure rather than a ring structure. In such an optical bus structure the upper segment 130, which closes loop 101, would not be present. The SN 104 connects the IOF ring 101 to the DWDM long-haul (core) network 105. Clearly, given sufficient number of wavelengths and allowing wavelength reuse, metro access ring 101 provides full mesh-type connectivity among all CO's. A metro access ring 110 connects a plurality of access terminals, S11–S1N, to CO 102 and to the IOF ring 101. The metro access ring 120 connects a plurality of access stations or terminals, S21–S2N, to CO 103 and to the IOF ring 101. The metro access ring 110 (120) collect traffic from and distributes traffic to the various users connected to the access terminals S11–S1N (and S21–S2M). Note that the variables N and M used to denote the number of stations connected to a CO is typically different for each CO loop. In the prior art, the access rings 110 and 120 were typically a SONET (synchronous optical network) rings which used time division multiplexed (TDM) optical signals.

While such SONET rings perform well, the strong and consistent growth in the demand for bandwidth has outgrown the SONET ring capacity. The techniques of our previously-identified patent application extended the enormous capacity and protocol independence of WDM into these short-haul ring networks, 110 and 120, so as to provide seamless connectivity from long-haul networks 105 to metropolitan area networks 101, to access networks 110 and 120, and ultimately to the user's desk top.

In accordance with one feature of the present invention, we extend the previously-identified patent application to a multiple access case where many stations may wish to access the same wavelength(s) at any time. More generally, the present invention is directed to an optical communication system comprising a central office connected over an optical facility to a plurality of stations, the optical facility including one or more optical fibers, at least one optical fiber carrying a plurality of optical communication wavelengths, and at least one of said wavelengths divided into multiple time slots. The system enables a station to communicate with another station or the central office using two or more different communication modes including (1) a space division multiplexed access (SDMA) mode, (2) a wavelength division multiplexed access (WDMA) mode, and (3) a time division multiplexed access (TDMA) mode. The SDMA addresses the situation where several stations may share multiple strands of fiber cables of an optical facility, e.g., 110, each fiber carrying one or more wavelengths. The present invention enables the SDMA, WDMA, and TDMA to simultaneously be shared among several stations using several methods of contention resolution. The methods of contention resolution utilized are: (a) use of a signaling network (electronics, optics, a channel on the same or a different network than the bearer network), (b) use of optical tagging techniques for the transfer of access information, (c) the use of a "time marker" technique within the bearer optical channel for transfer of channel access information, (d) the demodulation of the carrier wave (CW) at all times to detect a signal addressed to that station and then processing it.

Figure 2:
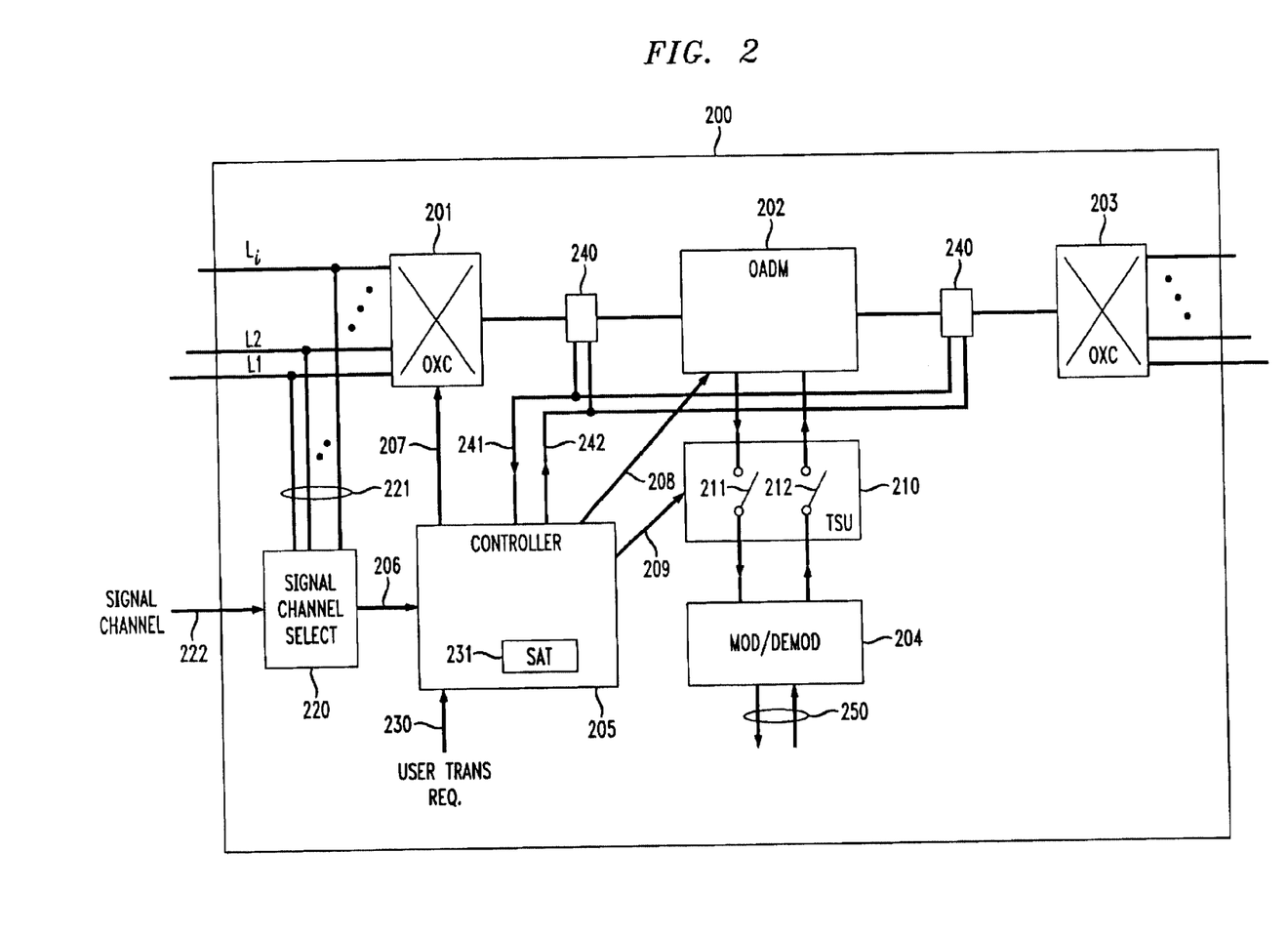
FIG. 2 shows, an illustrative block diagram of apparatus used at station or central office to provide the communication bandwidth allocation features of the present invention.

FIG. 2 shows, an illustrative block diagram of apparatus used at station 200, e.g., S11, to provide access to fiber links, wavelengths, and time slot(s) on optical facility 110, in accordance with the operating features of the present invention. Note that since each CO must contend for fiber links, wavelengths, and time slot(s) with other COs for transmission bandwidth on optical facility 101, the COs could also be implemented using the same illustrative block diagram of apparatus shown in FIG. 2. For our present example, however, we illustratively describe the FIG. 2 station apparatus 200 as being located at a station S11. As described in the prior patent application, the station 200 accesses wavelength signals originated by a laser source from CO, e.g., 102. When station S11 has information to send to another station, e.g., S12, or to CO 102, it modulates the wavelength by either using electrical or optical A modulators 204 in the manner described in the previously-referenced patent application. Thus, station S11 illustratively, includes an optical cross-connect (OXC) 201 which enables optical add/drop multiplexer (OADM) 202 to access any wavelength λ1–λj of any of the L1–Li optical fibers of access ring, e.g., 110. The OADM 202 also connects via OXC 203 to enable output access on any wavelength λ1–λj of any the L1–Li optical fibers of access ring, e.g., 110. Thus, functionally, OXC 201 and 203 provide space division multiple access (SDMA) at station S11. The demodulator/modulator unit 204 enables the demodulation and output of user information received over any wavelength selected by OADM 202 and enables the modulation of user information to be transmitted over the wavelength selected by OADM 202. Thus, OADM 202 provides wavelength division multiple access (WDMA) at station S11.

In the station apparatus 200, OXC 201 and OADM 202 may be implemented in a well known manner. In OADM 202, the demodulator/modulator unit 204 may be implemented in a well known manner to convert optical signals to and from electrical user signals 250 using an optical diode demodulator and an electrical to optical signal modulator (such as a semiconductor optical amplifier). For optical user signals 250 well known optical/optical transponders can be utilized for demodulator/modulator unit 204

Controller 205 operates under program control to generate and be responsive to the appropriate control messages sent over a signaling or bearer network to enable any station S11–S1N or CO 102 to communicate with each other. Controller 205 includes a Station Address Table (SAT) 231 which includes the address of each station S11–SjN accessible over optical facility 110. This SAT 231 is used by Controller 205 to determine whether or not a received transmission is for one of the stations on optical facility 110 and whether or not a transmission from a station S11–S1N is for another station on optical facility 110. Thus, Controller 205 is also responsive to a User Request signal 230 for requesting transmission capacity over optical facility 110. These transmission requests may utilize a combination of two or more of the SDMA, WDMA, and TDMA modes for communications. As will be discussed in later paragraphs different types of bandwidth access contention resolution may be used in the system of FIG. 1.

The Controller 205 is also responsive to control signal 206 from the signal channel select circuit 220 which tells the controller which fiber, wavelength, and timeslot(s) should be used for communications. The Controller 205 uses lead 207 to control optical fiber L1–Li selection for the SDMA mode, uses lead 208 to control selection of a wavelength λ1–λj for the WDMA mode, and uses lead 209 to control selection of a time slot(s) TS1–TSk for the TDMA mode. The lead 209 controls time slot unit (TSU) 210, which includes switches 211 and 212 to provide selected time slot access to the received and/or transmitted wavelengths at OADM 202. Thus, switches 211 and 212 provide TDMA for station S11. Control signal 206 is received from a signal select circuit 220 which receives signaling channel signals which may be obtained in a variety of ways from a signaling channel in one or more time slots TS1–TSk of one or more wavelengths λ1–λj received over one or more fibers L1–Li (221) or via a separate signaling facility (222). The signal select circuit 220 may be fixed, to access a fixed signaling channel, or may be rearrangeable, to access a signaling channel that may change. The signal select circuit 220 enables each station to resolve any time slot, wavelength, and optical fiber access contention using any of access resolution methods of the present invention which are described in later paragraphs.

With reference to FIG. 2, a tag read/write apparatus 240 which s connected to access each wavelength entering and exiting the station apparatus 200 is used by Controller 205 to read 241 or write 242 the optical tag information on each wavelength. Using this tag read/write apparatus, each station or CO on metro loop 110 can then monitor and generate the optical tag on all wavelengths.

Figure 3A:
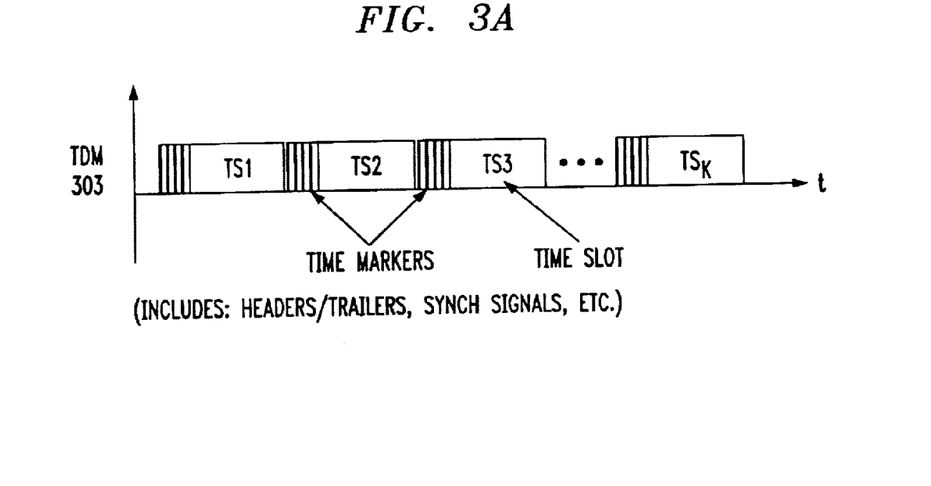
FIG. 3 illustrates the space division multiplexed access (SDMA), wavelength division multiplexed access (WDMA), and time division multiplexed access (TDMA) provided by the present invention.
Figure 3B:
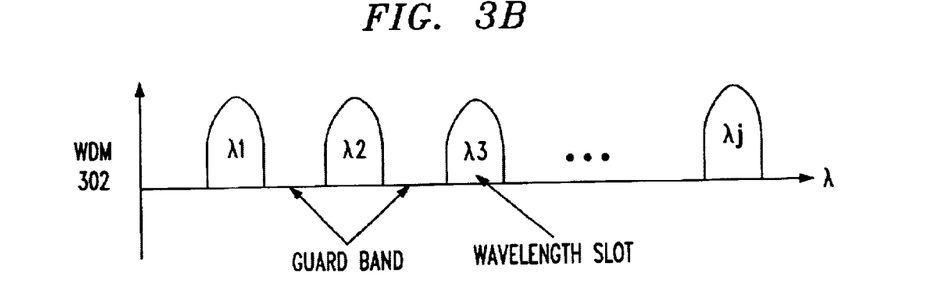
Figure 3C:
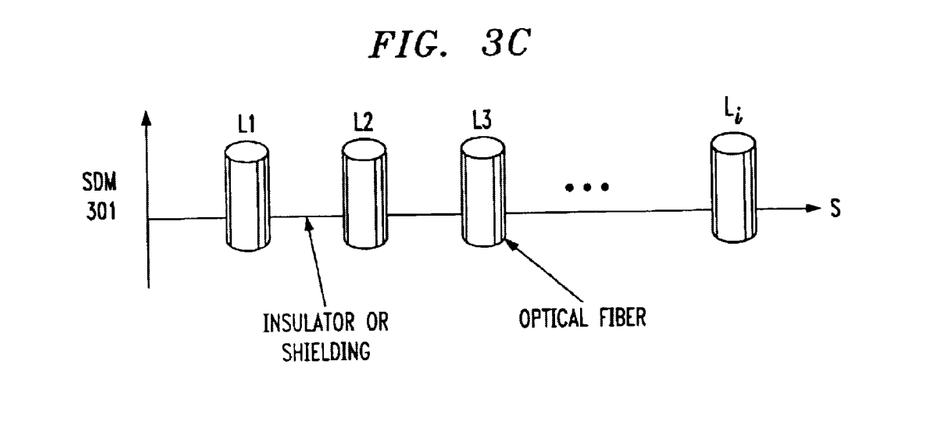

As shown in FIG. 3, in this manner, Controller 205 provides station S11 with space division multiplexed (SDM) access to any optical fiber L1–Li, 301, wavelength division multiplexed (WDM) access to any wavelength λ1–λj of any optical fiber, 302, and time division multiplexed (TDM) access to any time slot TS1–TSk of any wavelength of any optical fiber.

Since the present invention enables multiple stations, e.g., S11–S1N access to the same time slots, wavelengths and optical fibers, a method is needed for access contention resolution among the accessing stations. Three methods for contention resolution among multiple stations on the same or on multiple optical fibers is described. These mechanisms allow multiple stations to access some or all of the time slots of the one or more wavelengths on one or several fiber strands shared among multiple stations that are sourced from the same CO. The methods are flexible since they allow effective sharing of wavelengths by several stations, through arbitration of wavelengths' usage with time and space multiple access methods.

Each of the four access contention resolution methods described below has its own advantages and disadvantages as follows:

1. One method is to constantly demodulate each wavelength or continuous-wave (CW) signal (see 221 of FIG. 2) from all fibers at all stations. If after demodulation, a station (or CO) detects an identification signal (e.g., an address signal) it determines whether or not the signal is addressed to it. When no identification signal is present on the CW, a station may decide to modulate the CW with its own information (data). Since this method uses known techniques it is not discussed further.
2. A second method uses a separate electronic/optical signaling network to transfer wavelength usage information (i.e. signaling) to all stations. This "signaling network" may be implemented on a separate signaling channel, e.g., wavelength, on the same fiber strand that carries the wavelength with the bearer traffic (date communication wavelength). In essence this method provides an "out-of-band signaling" channel for the communication wavelengths that are shared among stations. The carrier signaling information is in the form of reservation messages that can be used for wavelength sharing.
3. A third method uses a "tag" on each bearer wavelength which would also carry information about wavelength sharing among stations. Due to the lower data bandwidth of the tag signal (than the wavelength), the channel assignment, arbitration, and access resolution steps may take longer.
4. The fourth method uses information about time slot assignment and arbitration within the bearer wavelengths using a mechanism hereafter called "markers" which are carried on each wavelength. Two methods of synchronous and asynchronous time marker transmission are described.

SEPARATE SIGNALING CHANNEL METHOD.

This method uses a separate "signaling" channel or network, much like the signaling system 7 (SS7) signaling technique used in circuit switched telephony. This signaling channel carries information that can be utilized by the stations on the same or different fiber strands to determine the channel usage and time slot assignment. An illustrative algorithm that can be used to arbitrate among stations will be described here. The algorithm enables the sharing of one or multiple wavelengths, on one or multiple cables. Other algorithms for wavelength assignment may also exist. Two signaling directions, CO-to-stations (downlink) and stations-to-CO (uplink) are considered.

Downlink Signaling Protocol

With reference to FIG. 1, Illustratively, CO 103 may send data to one (unicast) station S21 or to several (multicast) stations, S21–S2M, simultaneously. The transmission from CO 103 may originate from another CO, e.g., 102, connected over a ring or bus network 101. For example, station S11 connected to CO 102 may wish to transmit to station S21 connected to CO 103. In this example, S1 transmits to CO 102 in the uplink direction, CO 102 forwards the station S11 message to CO 103, and subsequently CO 103 forwards the message to station S21 in the downlink direction. For the downlink direction, CO 103 initiates a signaling message with the address of the recipient station(s) S21 over the signaling channel. The signaling message also carries identification of the wavelength (and time slot identification and/or fiber strand identification in case of multiple fibers) in 101 that will be used for data transmission. All stations S21–S2N monitor the signaling channel continuously. When stations recognize their own address in the signaling message, they start demodulating the wavelength that is identified in the signaling message from the CO.

The manner by which a CO uses the signaling channel to contend for a fiber strand, wavelength as well as time slot(s) for its transmission to the station(s) is the same manner as stations use to contend for fiber strand, wavelength, and time slot(s). The contention method is also similar to that used in the uplink direction and will be described after discussing the uplink signaling protocol.

Uplink Signaling Protocol

In this case, stations monitor the signaling channel and when they desire to send information to other stations or the CO they announce their intention by first reserving the bearer channel through a "reservation" signaling message on the signaling channel and then by sending a signaling message (called "intention-to-send") containing addresses of the recipient station(s).

Signaling Channel

The signaling channel is a multiple access channel shared among all stations on a ring or loop. Stations that wish to send a signaling message on that channel monitor the signaling channel and send their signaling message through sharing of a "reservation" message that circulates around the loop. Since the signaling channel is shared among all stations (usually on a given metro access loop, e.g., 110, there may be hundredths of stations), for example, the CO of the loop periodically sends a "reservation" signaling message around the loop in the signaling channel.

Figure 4:
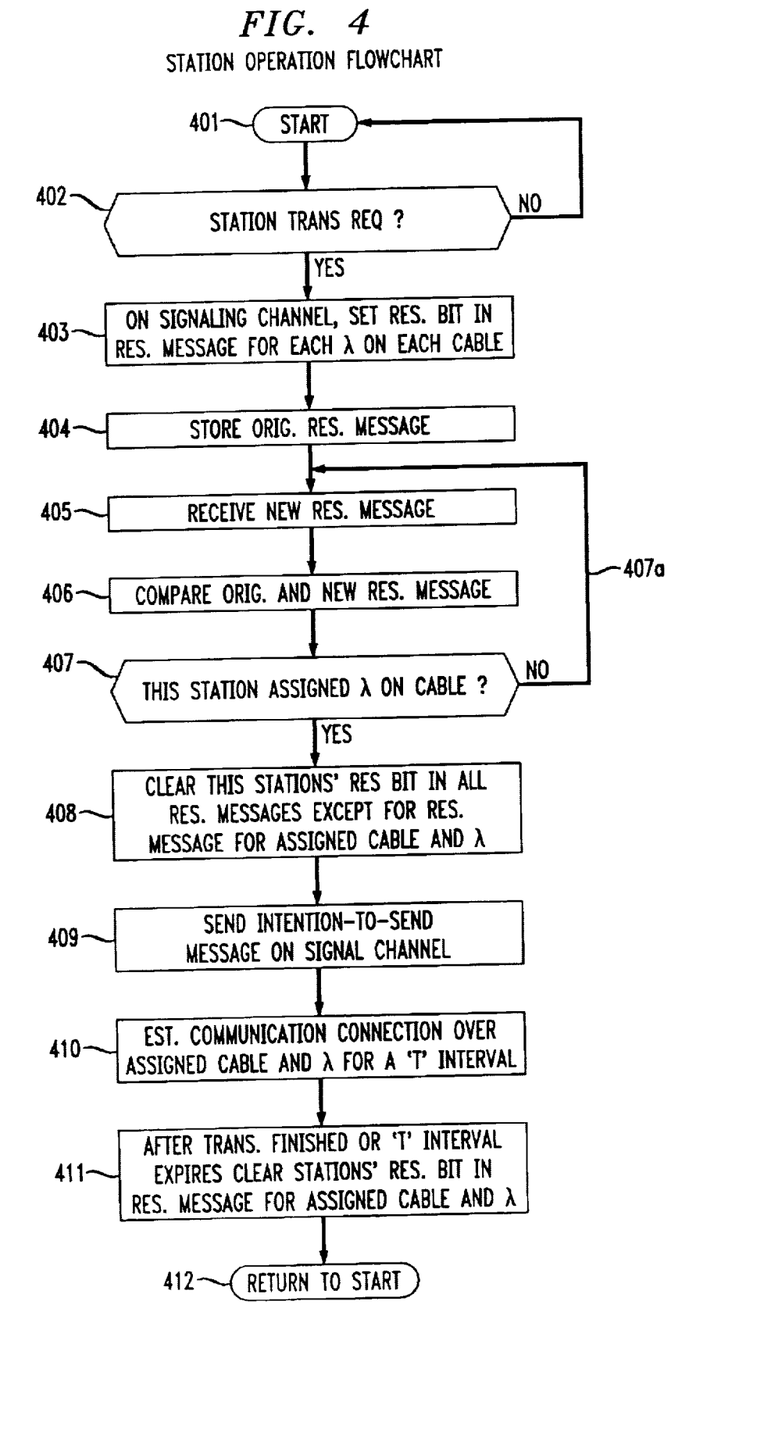
FIG. 4 shows a flowchart describing illustrative operations at a typical station.
Figure 5:
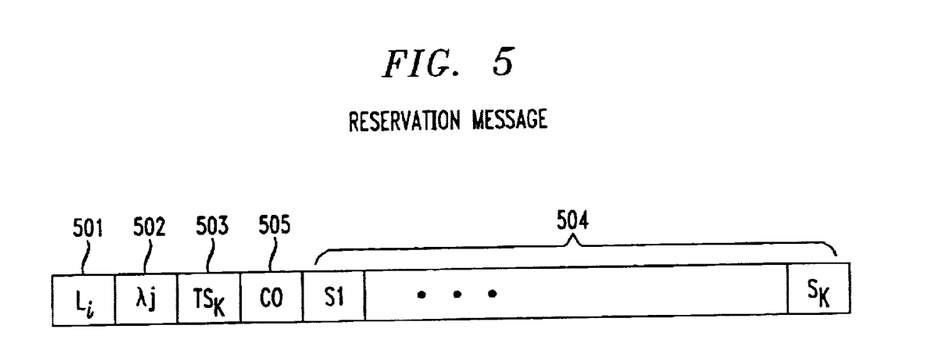
FIG. 5 shows the format of a reservation message.
Figure 6:
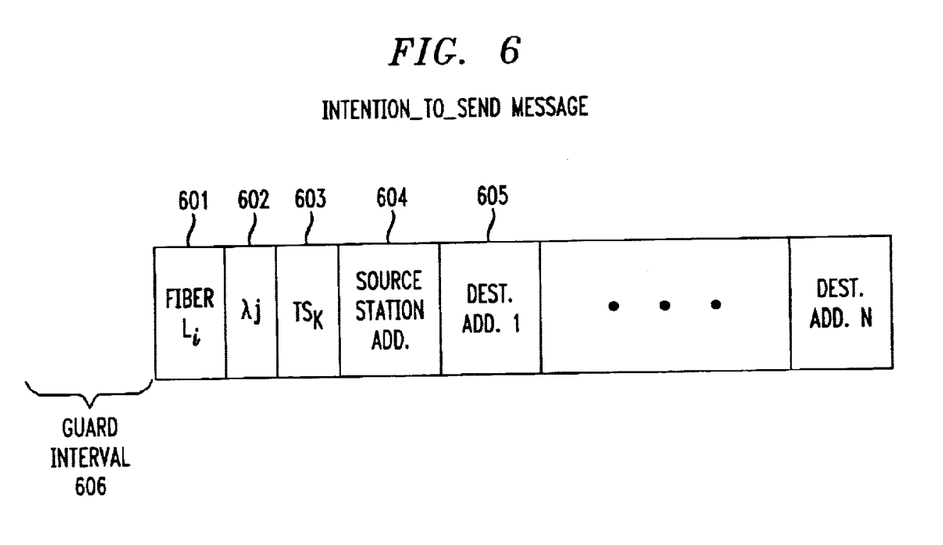
FIG. 6 illustrates the format of an intention-to-send message.
Figure 7:
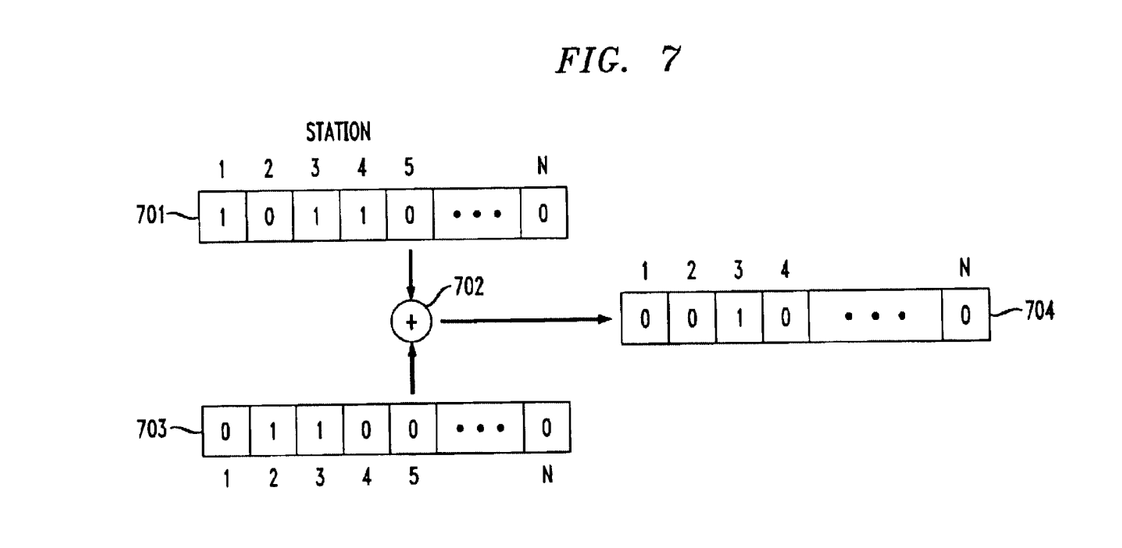
FIG. 7 shows, illustratively, one technique for comparison of the original and new reservation message contents at a station.

With reference to FIGS. 2 and 4 through 7, a typical operation of a station, e.g., S11, on a metro access ring 110 is described. From a start position 401, a station receives a reservation message over the loop which originates, for example, from the CO. In step 402, if the station has received a user transmission request 230, control passes to step 403, if not then control returns to step 401. In step 403, a reservation bit corresponding to the requesting station is set in a reservation message 510 to reserve one or more time slots 503 on each wavelength 502 on each fiber cable 501 which serves the station. A reservation message, shown in FIG. 5, is provided for each optical fiber 501 and wavelength 502 combination (i.e., fiber L1, wavelength λ1 through fiber Li, wavelength λj) and includes a field for time slot allocation 503. On fiber link Li, and wavelength λj, the reservation message circulates periodically. The message contains a '1' in the bit position associated with Sk if station Sk has an active (unsatisfied) reservation request. If a station does not have an outstanding reservation request, or has completed its transmission from a previous reservation request, the bit position associated with that station is set to '0'. In the reservation message optionally may contain the address of the central office (CO) at which the laser source is located. The process by which a reserving station finds out whether it is its turn to transmit is shown in FIG. 7. When it is a stations turn to send,(as determined by the apparatus of FIG. 7), an "intention-to-send" (as shown in FIG. 6) is initiated by the requesting station (hereinafter referred to as the Source station). As shown in FIG. 6, the "intention-to-send" message includes the Source station address 604 and the addresses 605 of all receiving (Destination) stations.

The reservation message is received by each station and retransmitted after a station sets a reservation bit corresponding to it in the reservation message for each wavelength and fiber cable combination (step 403) that it has access to. A "set" or logic 1 reservation bit represents a station's reservation request for transmission and will remain set until after that station has been granted a wavelength and completes its transmission on that wavelength. Each station knows its bit position 504 in the reservation message 510. In step 402, if a station does not wish to request transmission, it receives the reservation message and retransmits it unchanged, step 401a, on the signaling channel. A station with no request to transmit, may optionally check the reservation bit corresponding to it and reset it to "0" at all times before sending the reservation message to the next station.

In step 404, when a station requests to transmit, it stores as an 'original' reservation message the received reservation message including any other station reservation bits that were set in addition to the reservation bit set for this station. Thus, at each station requesting to transmit, the controller 205 would store the 'original' reservation message for each wavelength/fiber combination 510–520. The 'original reservation message refers to the reservation message stored by a station at the time before it sets its own station reservation bit to '1'. Thus a station that sets its station reservation bit sooner, obviously will receive the chance to seize a wavelength sooner. In FIG. 7, 701 illustratively shows for a station, an original reservation message having a reservation bit being set for stations 1 and 4, in addition to a reservation bit 3 set for station 3. Thus, the reservation message 701 consists a number of bits where each bit at "0" indicates that the station to which the bit is assigned to does not wish to send a message (stations 2 and 5-N), or has already completed its previous requested transmission, and each bit set to a "1" indicates that the corresponding station does wish to transmit a message(stations 1, 3, and 4 in this example). Since the reservation bits for stations 1 and 4 were set prior to the reservation bit for station 3, stations 1 and 4 must first be served before station 3. A station receiving the reservation message at any time, determines its turn to transmit by monitoring the status of output message 704 outputted from AND function 702. This procedure is described beginning in step 405 when a new reservation message is received. In step 406, the original 701 and newly received 703 reservation messages are compared for each wavelength/fiber combination 510–520 using AND function 702. The AND function 702 function is implemented in the software or firmware of controller 205.

As noted, the output of AND function 702 will have a output message 704 with a logic 1 in the bit positions of stations 1 and 4 until these stations have completed transmission. Thus, the steps 405, 406, 407, and 407a are repeated each time a new reservation message 703 arrives at the station and until the output message 704 of AND function or operation 702 has only a logic 1 in the bit position 3 associated with station 3. Note that while station 3 is awaiting its turn to transmit, other stations which did not have their reservation bits set may set them indicating their desire to transmit, e.g., station 2 as shown in 703. Thus, the newly received message 703 would contain a logic 1 in bit position 2, indicating that station 2 now also requests to transmit. However, since the AND operation 702 compares the newly received message 703 with the original reservation message 701 which existed before station 3 had first set its reservation bit, the outcome of AND operation 702 remains at logic 0 at the bit positions of those newly requesting stations, such as station 2 in our example.

When AND function 702 has only all zeros in the reservation bit positions in the output message 704 for a particular wavelength/fiber combination, it is its turn to use that wavelength/fiber combination as the bearer or communication channel over which to send its message traffic. Typically, a station chooses the first wavelength/fiber combination that becomes available for its transmission. After station 3 gets permission to transmit on a wavelength, it resets its reservation bit 3 on all other wavelengths to "0" (except for the one wavelength it wishes to use for transmission), step 408, so that those wavelengths become available to other stations. The reservation bit 3 on the wavelength it is transmitting however will not be turned to "0" until station 3 has completed transmission on the selected wavelength. Note that each station performs the AND operation with its stored reservation message that contains all stations' reservation request status right before the station turns its reservation bit. The stored reservation message remains stored until after the station wishes to make another request.

However as described in step 409, before a station starts its transmission on the bearer channel, it sends an "intention-to-send" message. This message is shown in FIG. 6. As shown, this message includes a fiber 601, wavelength 602, and time slot 603 identification as well as a source or transmitting station address 604 in addition to the address (es) of the receiving (destination) station(s) 605. The fiber 601 and wavelength 602 tells the receiving station where to find the bearer channel to receive the data messages from the transmitting station. A small time guard interval 606 is optionally used before each "intention-to-send" message in order to make sure that a previous station's transmission is complete. At the receiving stations, since all stations monitor the signaling channel, they receive the "intention-to-send" message which contains the address of the sender (source station) and the addresses of all of the receiving station as well as the fiber, wavelength and time slot identification of the bearer channel to be used for the transmission of traffic. Information destined to a station which is not on the same metro access ring(s) as the sending station is switched at the CO 102 to the metro loop 101 and to the designated CO, e.g., 103, and metro ring 120 which connect to the destination station, as shown in FIG. 1. Note, a CO determines if the receiving stations are on the same metro access loop 110 as the transmitting station by comparing the receiving station addresses against the list of stations listed in its Station Address Table 231. Similarly, each CO on metro loop 101 accesses its Station Address Table 231 to determine if the "intention-to-send" message is addressed to one of the stations on its metro access loop. When a different CO 103 other than the CO 102 on which the transmitting station 3 is located receives an "intention-to-send" message intended for one of its stations, that CO 103 goes through the same process of sending a reservation message 500 over its metro access loop to reserve a wavelength/fiber communication channel to the addressed destination station. The reservation process for a CO 103 is the same process as used by a station as previously described. When the CO receives its turn to transmit, it forwards the "intention-to-send" signaling message with the address of destination station over its metro loop.

Returning to FIG. 4, in step 410 the transmitting station follows the "intention-to-send" message with data messages sent over the bearer wavelength (i.e., the established communication channel) for a maximum duration of time interval (T). Note, the "intention-to-send" message is sent over the signaling channel while the traffic messages are sent over the bearer or data channel. Note, the reservation message continues being circulated on the metro access loop even while a station is transmitting. All stations are allowed to make reservations during other stations' transmission.

After expiration of the maximum transmission time interval T allocated to a station, the station must give up using the bearer wavelength. If a station wishes to use the channel for additional transmission beyond interval T, it must reset its reservation bit in the reservation message to "0", and wait for at least a T' interval before reserving again. Thus, in step 411, after completion of transmission or the elapse of the T' interval, control returns to the start position 401 for that station. The transmitting station immediately after completing its transmission turns its reservation bit back to "0" and is not allowed to turn it to "1" again before a time interval T' elapses.

As noted, a transmitting station is not allowed to put in two consecutive reservation requests in the signaling message unless a minimum time interval of T' has elapsed since completion of the last message transmission from that station. The time interval T' is determined such that all stations get at least a chance to reserve and subsequently send their information. The length of interval T' in addition to the number of stations on the loop N, also depend on the capacity of the signaling channel (C) and the "reservation" message size (L1) as well as other signaling messages (L2) that may be required for each transmission (such as "intention to send"). Adjusting the time intervals T and T' for each station results in a priority and bandwidth allocation for the stations.

Every time a reservation message is transmitted on a wavelength, the CO monitors its arrival at the CO. If a reservation message or a signaling message does not appear at the CO within an expected time interval T" (such may be the case if a message is lost on the metro ring), the CO retransmits a previous copy that is already in its buffer. In this case, it also allows the stations one round of signaling reservation update.

ALTERNATIVE SIGNALING CHANNEL APPROACH

Figure 8:
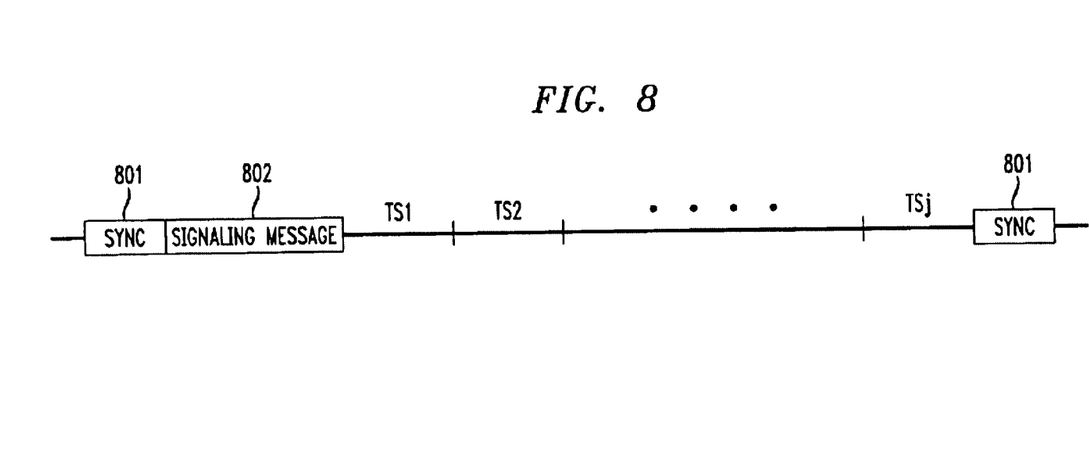
FIG. 8 shows, illustratively, a synchronizing message and a signaling message used for the assignments of time slots or intervals on a signaling channel.
Figure 10:
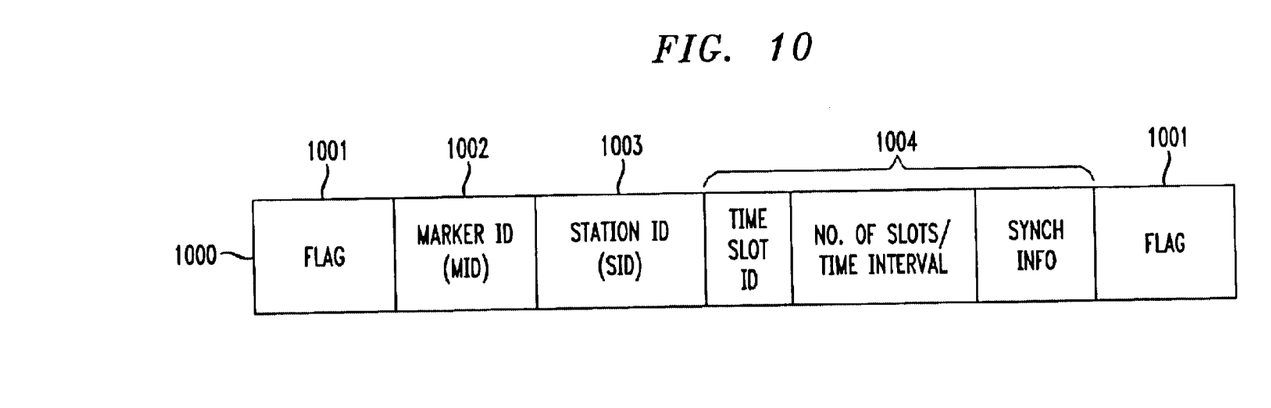
FIG. 10 shows, illustratively, the format of the a marker message used in one of the contention resolution arrangements.

In an alternate embodiment, shown in FIG. 8, a signaling channel constantly circulates a stream of synchronization messages 801 so that the bearer wavelength communications can be synchronized among sending and receiving stations. A "time_interval_assignment" message 802 contains information as to which station is assigned to which time slots, or time intervals, TS1–TSk, between the two synchronization messages 801. In this way, time slots of wavelengths are assigned among different stations in a continuous manner. When a station does not have data to send or no data is addressed to it as a receiving station, its assigned time between the two synchronization messages 801 remain unused. The time interval TS1–TSk between the two synchronization messages 801 is divided on some basis among stations, S11–S1N on a metro access loop. The time interval assignment can be varied among the stations either dynamically or statistically. FIG. 10 shows an example of a message that can be utilized for this purpose (this message is also used for the Marker method described later).

This method can be integrated with that of the previously described method so that each station can have a dedicated time slot and, thus, won't have to "reserve" transmission time at every instance they have data to send. This modified method calls for allocating a dedicated portion of time interval between two synchronization messages 801 to occasional traffic. Main portions of the time interval can also be assigned to stations based on "long term" reservation requests, or on a call by call basis.

Either method can be applied such that wavelengths on multiple fiber cables are allocated among a number of stations in a semi-static manner. In this way stations while assigned to a wavelength cannot use other wavelengths. The stations' static space assignment is then modulated with a dynamic time assignment where either on a connection basis, or on a per data segment basis the wavelength is shared among the fixed number of stations. These methods depend strongly on the applications being served.

OPTICAL TAGGING METHOD

The optical tagging method uses a unique optical tag which is modulated directly on the envelopes of each of the data modulated wavelengths 910 or which modulates a subcarrier frequency on each wavelength. The use of an optical tagging technique is described in the patent application entitled "Optical Internet Router" Ser. No. 09/406,520, filed on Sep. 28, 1999, by M. T. Fatehi and K. Sohraby and in the U.S. Pat. No. 5,745,274, issued to M. T. Fatehi et al on Apr. 28, 1998, both of which are incorporated by reference herein. With reference to FIG. 2, a tag read/write apparatus 240 connected to access each wavelength entering and exiting the station apparatus 200 is used by Controller 205 to read 241 or write 242 the optical tag information on each wavelength. Using this tag read/write apparatus, each station or CO on metro loop 110 can then monitor and generate the optical tag on all wavelengths.

Figure 9:
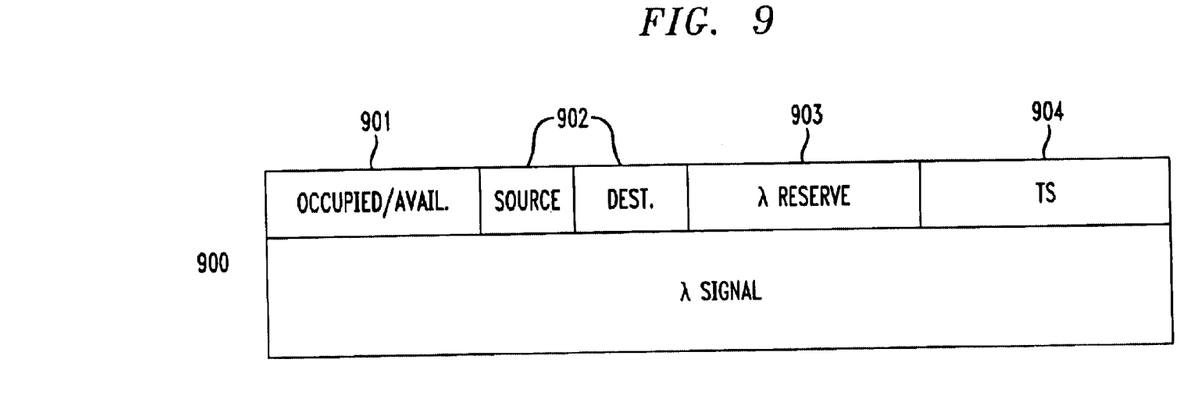
FIG. 9 shows, illustratively, the format of a tag message which is modulated on a data communication wavelength.

With reference to FIG. 9, when a wavelength is being used for transmitting a data signal, the transmitting station (including CO) indicates such condition by sending an "occupied wavelength" message 901 in the tag 900 modulated on that wavelength. When the tag reader at other stations encounter this message, the wavelength is assumed to be available. When the wavelength is unused by the CO or by the other end users, there will be no message carried in the tag on that wavelength. Lack of a message (or alternatively, existence of a message 901 indicating "available wavelength") on tag 900 is an indication to the CO and/or stations that the wavelength is available. Tags can be read using station circuitry in the Signal Channel Select circuit 220, which may be implemented in the manner described in the above-referenced optical tag patent application. The advantage of this tag arrangement is that there is no need to demodulate the optical wavelength into an electrical signal in order to determine the availability of the wavelength. When a channel is occupied, the tag messages may also contain information about the stations' identification (source/destination address 902) and "wavelength" information 903. When the contents of the tag indicate that neither the CO nor any station (end user) is using the wavelength, a station (end user) requesting service can start using the wavelength and simultaneously send a tag message indicating that. Subsequently, the requesting station (end user) modulates that wavelength with its data messages in the manner described in the above-referenced optical tag patent.

MARKER TECHNIQUE

A "marker" message in this application is a unique bit pattern, as shown in FIG. 10, which is transmitted by the CO on each bearer wavelength. The marker a message 1000 consists of two "flags" 1001 comprising a unique bit pattern (such as '01111110') not unlike the X.25 packet boundary flags. These flags 1001 ensure that the receiving stations can recognize the marker message 1000 properly and will not mistakenly interpret the marker message. Other marker fields include a Marker ID (MID) 1002 which indicates the type of marker (i.e., intended to a station for time slot allocation, or the synchronization marker). The next field is SID 1003 which contains the unique addresses of stations which are on the local loop. Since the marker is always initiated by the CO, SID will contain the address of a station to which the marker is addressed to. A Synchronous/Access Info field 1004 provides synchronization and access information to the receiving stations.

All stations around the metro access loop recognize the marker message. 1000. The receiving stations then decode the Marker ID field 1002 to determine which time slots may be assigned to the different stations. The process of time slot/time interval allocation through the marker is as follows: When MID refers to time slot/interval allocations, the subsequent field 1004 will indicate this time slot ID and duration of the interval (or equivalently the number of time slots) allocated to the station which is identified in SID. The format of the field 1004 is shown to include a time slot ID field, a number of slots/time interval field, and a synchronous information field, the time slot/interval field is measured starting from a framing point usually included in the synchronous information field. The synchronous information field may contain data such as network transmission time references as a means of maintaining synchronization. In order to maintain synchronization between the stations as well as the CO, either periodically or in certain pre-determined time intervals, the Synchronous/Access Info field 1004 provides unique information to synchronize receiver stations to the source station. When periodic synchronization is implemented, the MID in FIG. 10 refers to a "synchronization" message. In this case all stations capture this message and synchronize to the reference time indicated by the message The SID for synchronization messages refers to "all stations". In field 1004, the "Time Slot ID" and "No. of Slots/Time Interval" remain unused.

The marker technique can utilize either a synchronous or asynchronous mode of operation. The synchronous mode uses a marker message 1000 transmission having a fixed interval of time (such as 125 micro-seconds). A station can be allocated one slot or a portion thereof (such as is the case with SONET tributaries, DS1 time slot allocation, etc.), however, unlike SONET there is no specific frame structure for sharing the fixed time slots. However, we do not exclude using a SONET or SONET-like frame for transmission on all or some of the wavelengths.

The asynchronous mode uses marker messages 1000 that are transmitted only to indicate a time interval that correspond to the amount of time that is allocated to a transmitting station on a wavelength. In this mode however, in order to maintain station synchronization at certain minimum (pre-determined) times, a synchronization message containing synchronization information, as descibed earlier, is also transmitted by the CO.

Marker techniques can be implemented using the circuitry shown in FIG. 2. Thus Controller 205, in response to information received from Signal Channel Select circuit 220, would control the receiving of data messages during any time slots TS1–TSk of any wavelengths $\lambda 1$–$\lambda j$ on any fibers L1–Li using OXC 201, OADM 202, TDMA unit 210, and Demodulator 204. Or Controller 205, in response to a User Transmit Request signals 230, would control the transmitting of data messages during any time slots 1–TSk over any of the wavelengths $\lambda 1$–$\lambda j$ on fibers L1–Li using modulator 204, TDMA unit 210, OADM 202, and OXC 201.

What has been described is merely illustrative of the application of the principles of the present invention. Other methods and arrangements can be implemented by those skilled in the art without departing from the spirit and scope of the present invention.

What is claimed is:

1. An optical communication system comprising
   a Local Serving Office, LSO, connected over an optical facility to a plurality of stations,
   the optical facility including one or more optical fibers, at least one optical fiber carrying a plurality of optical communication wavelengths, and at least one of said wavelengths divided into multiple time slots, and wherein
   the LSO and at least one station include
      communication apparatus for establishing a communication connection between a station and another station or the LSO using a combination of two or more different communication modes selected from a group including (1) a space division multiplexed access, SDMA, mode which selects one or more of said optical fibers of the optical facility, (2) a wavelength division multiplexed access, WDMA, mode which selects one or more of said wavelengths utilized on one or more of said optical fibers, and (3) a time division multiplexed access, TDMA, mode which selects one or more time slots utilized on one or more of said wavelengths wherein
   the LSO and at least one station further includes
      an optical cross connect for providing a SDMA connectivity to said optical facility,
      an optical add/drop) multiplexer for providing WDMA connectivity to said optical facility,
      a modulator/demodulator for providing TDMA connectivity over said optical facility, and
      a controller for selecting the two or more communication modes in responsive to either a user transmission request or a received signaling channel signal.

2. The optical communication system of claim 1 wherein the LSO and at least one station further includes
   communication mode selection apparatus for selecting the communication modes using out-of-band signaling over a wavelength of said optical fiber.

3. The optical communication system of claim 1 wherein the LSO and at least one station include further includes
   communication mode selection apparatus for selecting the communication modes using an optical tag signaling on a wavelength used for communicating data over said optical fiber.

4. The optical communication system of claim 1 wherein the LSO and at least one station further includes communication mode selection apparatus for selecting the communication modes using marker signaling on a wavelength used for communicating data over said optical fiber.

5. The optical communication system of claim 4 wherein the marker signaling is synchronous.

6. The optical communication system of claim 4 wherein the marker signaling is asynchronous.

7. An optical communication system comprising a Local Serving, Office, LSO, connected over an optical facility to a plurality of stations, the optical facility including one or more optical fibers, at least one optical fiber carrying a plurality of optical communication wavelengths, and at least one of said wavelengths divided into multiple time slots, and wherein the LSO and at least one station include communication apparatus for establishing a communication connection between a station and another station or the LSO using a combination of two or more different communication modes selected from a group including (1) a space division multiplexed access, SDMA, mode which selects one or more of said optical fibers of the optical facility, (2) a wavelength division multiplexed access. WDMA, mode which selects one or more of said wavelengths utilized on one or more of said optical fibers, and (3) a time division multiplexed access, TDMA, mode which selects one or more time slots utilized on one or more of said wavelengths wherein the LSO further includes a station address table, SAT, for storing the address of station which connects to the LSO over said optical facility and wherein the LSO uses the SAT to determine if a data message received by the LSO is addressed to a station which connects to the LSO over said optical facility.

8. The optical communication system of claim 7 wherein when the LSO receives a data message which is not from a station connected over said optical facility but which is addressed to a station connected over said optical facility, the LSO requests data communication capacity on said optical facility to transmit the data message to the addressed station.

9. A method of operating an optical communication system including a Local Serving Office, LSO, connected over an optical facility to a plurality of stations, the optical facility including one or more optical fibers, at least one optical fiber carrying a plurality of optical communication wavelengths, the method comprising the steps of at the LSO or at at least one station receiving either a user transmission request or a signaling channel signal to establish a communication connection to the LSO or to the at least one station, establishing a communication connection using a combination of two or more different communication modes selected from a group including (1) a space division multiplexed access, SDMA, mode which selects one or more of said optical fibers of the optical facility, (2) a wavelength division multiplexed access, WDMA, mode which selects one or more of said wavelengths utilized on one or more of said optical fibers, and (3) a time division multiplexed access, TDMA, mode which selects one or more time slots utilized on one or more of said wavelengths, wherein at the LSO and at least one station the method comprises the steps of providing a SDMA connectivity to said optical facility, providing WDMA connectivity to said optical facility, providing TDMA connectivity over said optical facility, and selecting the two or more communication modes in response to either a user transmission request or a received signaling channel signal.

10. Station apparatus for use at a station connected to an optical facility, the optical facility including one or more optical fibers, at least one optical fiber carrying a plurality of optical communication wavelengths, and at least one of said wavelengths divided into multiple time slots, the station apparatus comprising apparatus for receiving either a user transmission request or a signaling channel signal to establish a communication connection over the optical facility, communication apparatus for establishing a communication connection over the optical facility using a combination of two or more different communication modes selected from a group including (1) a space division multiplexed access, SDMA, mode which selects one or more of said optical fibers of the optical facility, (2) a wavelength division multiplexed access, WDMA, mode which selects one or more of said wavelengths utilized on one or more of said optical fibers, and (3) a time division multiplexed access, TDMA, mode which selects one or more time slots utilized on one or more of said wavelengths an optical cross connect for providing a SDMA connectivity to said optical facility, an optical add/drop multiplexer for providing WDMA connectivity to said optical facility, a modulator/demodulator for providing TDMA connectivity over said optical facility, and a controller for selecting the two or more communication modes in responsive to either a user transmission request or a received signaling channel signal.

11. The station apparatus of claim 10 further comprising communication mode selection apparatus for selecting the communication modes using out-of-band signaling over a wavelength of said optical fiber.

12. The station apparatus of claim 10 further comprising communication mode selection apparatus for selecting the communication modes using an optical tag signaling on a wavelength used for communicating data over said optical fiber.

13. The station apparatus of claim 10 further comprising communication mode selection apparatus for selecting the communication modes using marker signaling on a wavelength used for communicating data over said optical fiber.

14. The station apparatus of claim 13 wherein the marker signaling is synchronous.

15. The station apparatus of claim 13 wherein the marker signaling is asynchronous.

* * * * *